(12) United States Patent
Ringuette

(10) Patent No.: US 9,996,517 B2
(45) Date of Patent: Jun. 12, 2018

(54) AUDIO INPUT OF FIELD ENTRIES

(71) Applicant: Lenovo (Singapore) Pte. Ltd., Singapore (SG)

(72) Inventor: Justin Michael Ringuette, Morrisville, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days. days.

(21) Appl. No.: 14/933,796

(22) Filed: Nov. 5, 2015

(65) Prior Publication Data

US 2017/0132191 A1    May 11, 2017

(51) Int. Cl.
*G10L 15/00* (2013.01)
*G06F 17/24* (2006.01)
*G10L 15/26* (2006.01)
*G10L 15/18* (2013.01)
*G06F 17/27* (2006.01)

(52) U.S. Cl.
CPC ........ *G06F 17/243* (2013.01); *G06F 17/2775* (2013.01); *G10L 15/1822* (2013.01); *G10L 15/26* (2013.01)

(58) Field of Classification Search
CPC ..... G10L 15/00; G10L 15/18; G10L 15/1815; G10L 15/1822; G10L 15/183; G10L 15/22; G10L 15/26; G10L 2015/00; G10L 2015/22; G10L 2015/228
USPC .......................... 704/257, 231, 235, 251, 270
See application file for complete search history.

(56) References Cited

U.S. PATENT DOCUMENTS

| | | | |
|---|---|---|---|
| 6,587,824 B1 | 7/2003 | Everhart et al. | |
| 8,255,218 B1 | 8/2012 | Cohen et al. | |
| 2002/0143533 A1 | 10/2002 | Lucas et al. | |
| 2003/0033146 A1* | 2/2003 | Morin | G10L 15/22 704/251 |
| 2004/0243419 A1* | 12/2004 | Wang | G10L 15/1822 704/277 |
| 2005/0071172 A1 | 3/2005 | James | |
| 2008/0243502 A1* | 10/2008 | Ativanichayaphong | G10L 15/193 704/240 |
| 2008/0255838 A1 | 10/2008 | Callaghan et al. | |
| 2009/0254348 A1 | 10/2009 | Moore et al. | |
| 2012/0323574 A1* | 12/2012 | Wang | G10L 15/22 704/246 |
| 2015/0149354 A1 | 5/2015 | McCoy | |

FOREIGN PATENT DOCUMENTS

| | | |
|---|---|---|
| EP | 1122636 A2 | 8/2001 |
| JP | 2012185225 A | 9/2012 |
| WO | 2004072846 A2 | 8/2004 |

* cited by examiner

*Primary Examiner* — Qi Han
(74) *Attorney, Agent, or Firm* — Ference & Associates LLC

(57) ABSTRACT

One embodiment provides a method, including: accessing, using a processor, a form comprising at least one fillable field; receiving, from an audio input device, audio input from a user; identifying, using a processor, a fillable field associated with the audio input; and providing input, based on the audio input, to the fillable field associated with the audio input. Other aspects are described and claimed.

18 Claims, 3 Drawing Sheets

AUDIO INPUT OF FIELD ENTRIES

BACKGROUND

Information handling device ("devices"), for example, cell phones, smart phones, tablet devices, laptop computers, personal computers, and the like, allow users to provide input through a variety of sources. The user can provide input to applications using a variety of input methods (e.g., standard keyboard, soft key input, gesture input, audio input, etc.). Depending on the form of the device, some of these input methods may be more convenient than others. For example, if a user is providing input to a smart phone, audio input may be more convenient due to the small form factor of the smart phone. However, in some cases the most convenient input method based on the form factor of the device may not be the most convenient input method based on the entries that a user wants to make.

BRIEF SUMMARY

In summary, one aspect provides a method, comprising: accessing, using a processor, a form comprising at least one fillable field; receiving, from an audio input device, audio input from a user; identifying, using a processor, a fillable field associated with the audio input; and providing input, based on the audio input, to the fillable field associated with the audio input.

Another aspect provides an information handling device, comprising: an audio input device; a processor operatively coupled to the audio input device; a memory device that stores instructions executable by the processor to: access a form comprising at least one fillable field; receive, from the audio input device, audio input from a user; identify a fillable field associated with the audio input; and provide input, based on the audio input, to the fillable field associated with the audio input.

A further aspect provides a product, comprising: a storage device that stores code executable by a processor, the code comprising: code that accesses a form comprising at least one fillable field; code that receives, from an audio input device, audio input from a user; code that identifies a fillable field associated with the audio input; and code that provides input, based on the audio input, to the fillable field associated with the audio input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
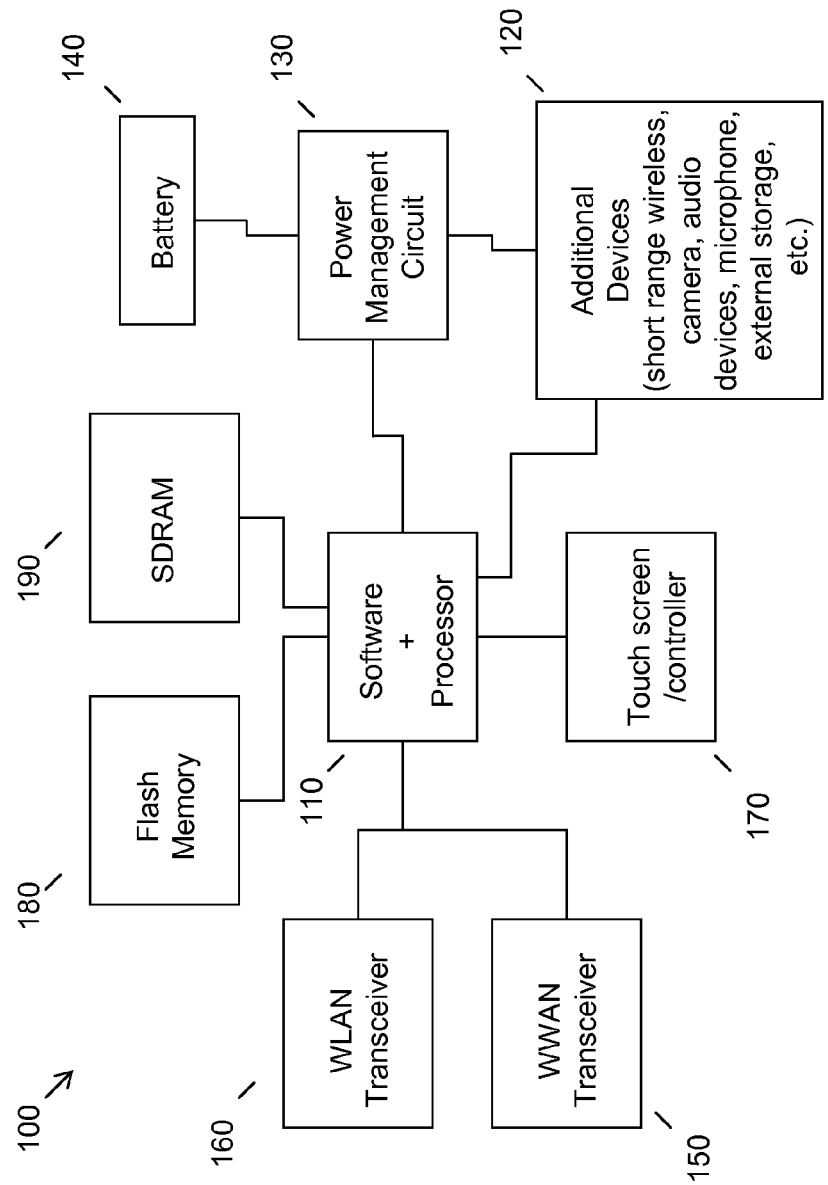
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Certain input methods may be more convenient on particular devices. For example, using a laptop computer it may be convenient to use a standard keyboard. However, on a smaller device or a device without a conventional keyboard attached, for example, a tablet, smart phone, and the like, it may be more convenient to use less conventional input methods, for example, audio input, gesture input, and the like. One problem with these less conventional input methods is that the entries that a user is trying to make may not be designed with these input methods in mind. For example, if a user is providing entries to a form, providing audio input may result in more tedious data entry. In conventional field entry, the user may provide audio input for a selected or highlighted field and then has to manually select (e.g., using a keyboard, mouse, soft key input, or the like) the next field that the user wants to provide input for. Using the soft keyboard provided on the device to provide text entry may also be very tedious and may not be possible for all users, for example, if the user has a handicap, in a hands-free environment, or the like.

Another solution relies on a replacement of the entry form with a voice only entry form. For example, rather than a standard contacts list, the system replaces the contact list with a voice entry contact list. The user may then provide audio input that will move through the fields based upon a command by the user. One problem with this system is that a user has to provide a specific command to navigate through the form. The user may forget the command which results in frustration for the user. Additionally, the user is unable to uniquely identify the field so they must navigate through the entire field sequentially, often including all interactive page elements such as buttons or radial buttons. The result is that the system becomes error-prone and imprecise. Another problem with this approach is that the entire system is replaced with a system that is purpose coded to be pure speech. If a user wants to provide input other than voice input, the user is unable to do so using such a method. Additionally, every form or field entry that the user wants to fill out has to be replaced using such a system. In other words, rather than having a system that interfaces with any application, each application has to be fully replaced with a new purpose coded application.

These technical issues present problems when providing hands free input to and navigation between fields. Typical applications require the user to provide two different types of input, one to provide input to a field and one to navigate to different fields, making this type of data entry tedious and inconvenient. Some applications may allow voice input and navigation, but require that the application be purpose coded for that purpose and will not interface with other applications. Additionally, in typical voice based applications the user has to provide particular commands to navigate through different fields on a form, which may result in an unnatural way of providing audio input.

Accordingly, an embodiment provides a method of receiving audio input from a user, which may be spoken in a more natural way for the user. The system may identify the fillable field within a form and provide the input based on the audio input to that field, providing a more seamless and convenient way for users to interact with fields within a form. For example, a user may provide audio input for adding a new contact by saying "John Doe, (123)555-6789". One embodiment may parse the audio input and identify that "John Doe" fits within the "Contact Name" field and fill in that field with the correct name. An embodiment may additionally identify that "(123)555-6789" fits within the "Phone Number" field and may fill in that field accordingly.

In identifying the field associated with the audio input, one embodiment may compare the audio input to a fillable field within the form. For example, if a user provides a social security number, an embodiment may compare the format of the audio input to expected values of fields to identify which field the input should be provided in. One embodiment may access other data in order to identify the field. For example, one embodiment may access the field identifier, source code associated with the form or field, and the like to identify the field. Additionally, one embodiment may use context data within the audio input or form to identify which field the input should be provided within.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an audio input device such as a microphone. System 100 often includes a touch screen 170 for data input and display/rendering. System 100 also typically includes various memory devices, for example flash memory 180 and SDRAM 190.

Figure 2:
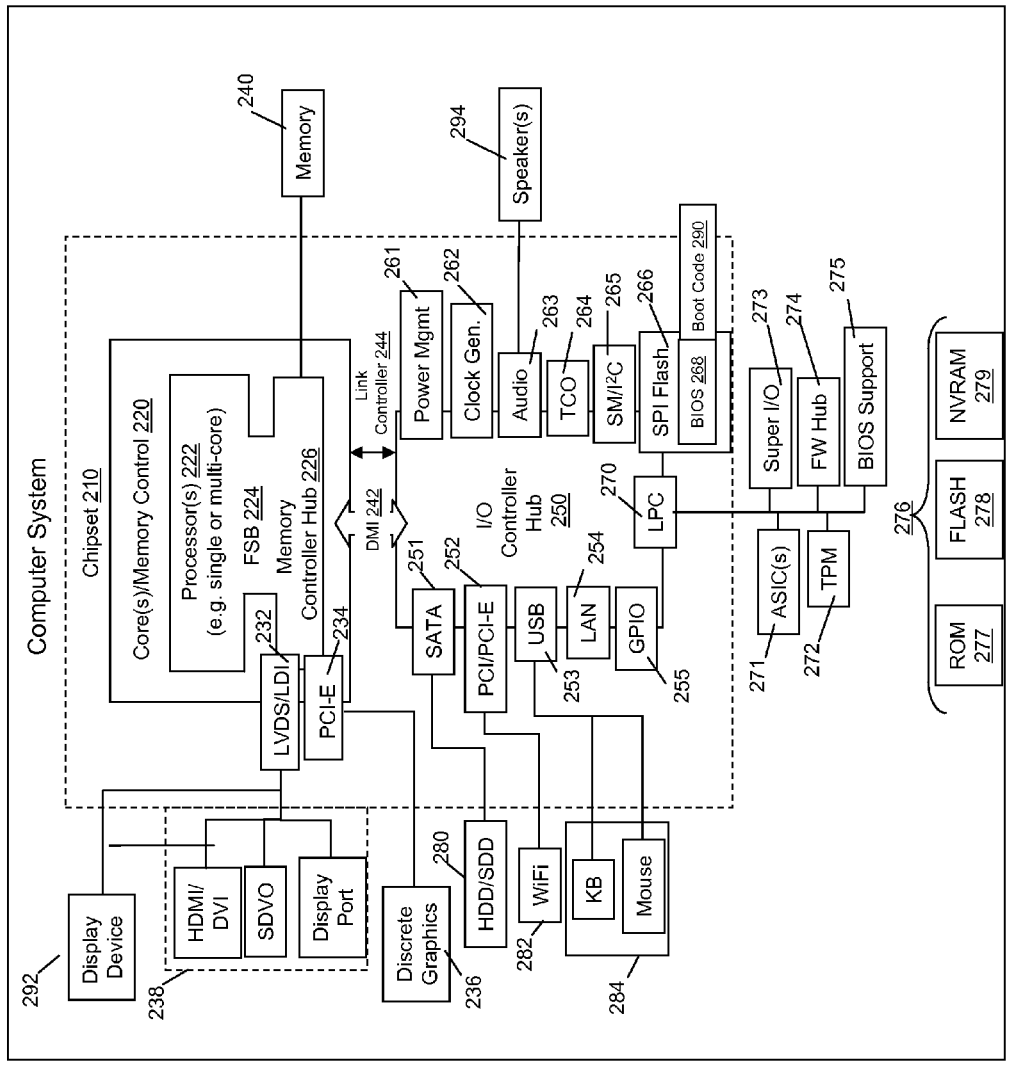
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use for providing input for fillable fields. For example, the circuitry outlined in FIG. 1 may be implemented in a tablet or smart phone embodiment, whereas the circuitry outlined in FIG. 2 may be implemented in a personal computer embodiment.

Figure 3:
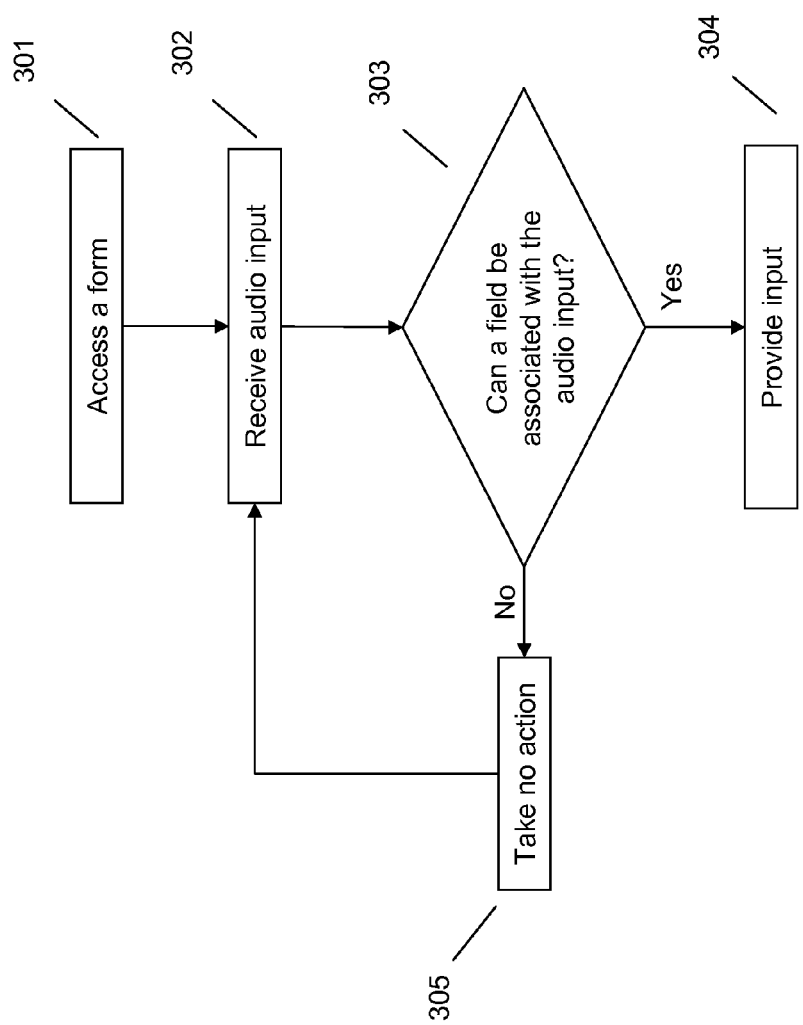
FIG. 3 illustrates an example method of audio input of field entries.

Referring now to FIG. 3, an embodiment may access a form comprising at least one fillable form at 301. Accessing the form may include downloading and opening the form, a user opening an application having fields for user entry, receiving the form from another source, opening a web page with fillable fields, and the like. As an example, a user may access an application contained on a device having fields which require user entry. Some example forms may include a contact list, an interactive fillable form (e.g., job application, tax form, warranty form, registration form, etc.), a web page having fields, an application having fields requiring user entry, and the like. The fillable fields may include any fields for which a user may provide input.

At 302, an embodiment may receive audio input from a user from an audio input device. This audio input may include input corresponding to a field within the form. The user may provide the input including field designations. For example, a user may state "Name: Plumber Joe, Work Number: (555)999-8888". Alternatively, a user may provide field designations which do not match with form's field designations. For example, a user may state "Field 1: Jack, Field 2: 1234-5678-9101-1121". In one embodiment, the user may provide the input without a field designation. As an example, a user may use natural language speaking to provide the input and state "Jane D. Smith, 555-55-5555, 1234 W. $5^{th}$ Street, New York, 99999".

Upon receiving the audio input, an embodiment may identify whether a fillable field can be associated with the audio input, at 303. In one embodiment, the identification may include parsing the audio input to identify different parts of the input. For example, the system may parse the audio and identify that the input includes a field identifier (e.g., the name of the field, the designator for the field, the text associated with the field, the identification number of the field, etc.). The audio field identifier may then be used to find the field identifier within the form that matches the field identifier. This field may then be associated with the audio input provided. If the user provides input for more than a single fillable field, an embodiment may identify the fields which are associated with each part of the audio input. Alternatively, a user may provide input which does not include the name of the field identifier, but rather includes a numbering of the fields (e.g., "Field 1", "Field 2", etc.), natural language speech (e.g., "Jane Smith, 1700 $2^{nd}$ Street", etc.), similarity to the field identifier (e.g., the field identifier states "Mobile Number", the user states "Cell: (777)777-7777), partial field identifier (e.g., the field identifier is "Full Name", the user states "Name: Jackie Jones"), or other type of designation.

One embodiment may compare the audio input with the at least one fillable field. As one example, an embodiment may access the source code associated with the form to identify field identifiers, expected values, fields formats, and the like. Based on this information, an embodiment may compare the provided input to the fields to find the field which matches the audio input or may be most closely related to the audio input. For example, if a user provides an input comprising numbers, an embodiment may compare the received numbers to expected entries in the field. As an example, if a user provides a phone number having ten digits, an embodiment may identify the field which is expecting numbers and also expecting ten numbers. Using this information, an embodiment may associate that field with the input.

One embodiment may identify that a fillable field has a similarity to the audio input. For example, if a user provides a middle initial, an embodiment may identify only fields which expect a text value rather than a numeric value. These fields would be considered to have a similarity to the audio input. An embodiment may also identify the fields which are expecting a single character. These fields would then have a greater similarity to the audio input. In one embodiment, the similarity may be measured using a value. For example, one field may have more similarity to the input than another, which may result in a higher value. If this value reaches a particular threshold, an embodiment may determine that this is the field that should be associated with the audio input. The association may also be based upon a confidence score. Each associated field may have a confidence score associated with it indicating how confident the system is that this is the correct field. Fields having a confidence score below a particular threshold may require the user to confirm that the input has been associated correctly.

An embodiment may be able to use the context of the audio input to identify what input the user is providing. For example, if a user is providing numbers in combination with words, an embodiment may use that context to identify the input as a street address. In addition, an embodiment may use the context of the form to identify the correct field that the audio input should be associated with. As an example, an embodiment may identify that the form is a tax form, for example, through the use of optical character recognition (OCR), using the format of the form, using example forms, comparing the form to a library of previously identified forms, and the like. Based upon identifying the form as a tax form, an embodiment may be able to use that context to better associate the audio input to the correct field within the form.

If an embodiment cannot identify a fillable field at 303, an embodiment may take no action at 305. Additionally, an embodiment may wait to receive additional audio input from the user at 302. As an alternative, an embodiment may indicate to a user that the audio input cannot be associated with a fillable field and may request additional input from the user. For example, an embodiment may request that the user repeat the audio input, repeat a portion of the audio input, confirm the field is the correct field, and the like. The user may also provide a non-audio input, for example, the user may select or indicate the correct field using a soft key.

If, however, an embodiment can identify an associated fillable field at 303, an embodiment may provide input, based on the audio input, to the fillable field at 304. The input may include all or only a portion of the provided audio input. For example, if an embodiment identified that the audio input contained input for more than one field, an embodiment may provide only the portion of the audio input that corresponds to a particular field. An embodiment may then provide the input that is associated with other fields to the correct fields. In one embodiment, the provided input may comprise machine text. For example, the system may convert the audio input to machine text as if the user had typed the input into the form.

The various embodiments described herein thus represent a technical improvement to hands free navigation on a device. Using the techniques described herein, a user can provide input to and navigate through fillable fields using a single input source. Additionally, the user can provide input in a more natural way without the necessity of specific commands. The techniques provide an alternate method of navigating through an application already existing on the system rather than replacing the whole the system. The system can be independent from all applications and thereby interface with any application. Additionally, the system is able to navigate through different fields without any knowledge of the actual form by using an association between the audio input and the form fields.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
accessing, at an information handling device and using a processor, a form comprising at least one fillable field, wherein the at least one fillable field is identified using an optical character recognition technique;
receiving, from an audio input device, audio input from a user, wherein the audio input comprises a plurality of portions, each portion comprising input associated with a different finable field of the form;
identifying from the audio input, using a processor, a fillable field associated with each portion of the audio input, wherein the identifying comprises parsing, using an automatic speech recognition technique, the audio input to recognize each of the portions of the audio input and identifying, from the parsed audio input, a fillable field of the form corresponding to each portion of the audio input; and
providing input, using a processor, to the fillable field on the information handling device associated with the audio input, wherein the providing input comprises identifying an input to the fillable field from the parsed audio input and converting the identified input to machine-recognized text for input to the identified fillable field.

2. The method of claim 1, further comprising comparing the audio input with the at least one fillable field.

3. The method of claim 2, wherein the identifying comprises identifying the fillable field based upon the fillable field having a similarity to the audio input.

4. The method of claim 1, wherein the providing input comprises providing at least a portion of the audio input to the fillable field.

5. The method of claim 1, wherein the audio input comprises a field identifier and wherein the providing comprises providing input to the fillable field associated with the field identifier.

6. The method of claim 1, further comprising accessing context data associated with the audio input.

7. The method of claim 6, wherein the identifying comprises identifying the fillable field based upon the context data.

8. The method of claim 1, further comprising accessing source code of the form and wherein the identifying comprises identifying the fillable field based upon the source code.

9. The method of claim 1, wherein the providing input comprises providing machine text to the fillable field.

10. An information handling device, comprising:
an audio input device;
a processor operatively coupled to the audio input device;
a memory device that stores instructions executable by the processor to:
access, at the information handling device, a form comprising at least one finable field, wherein the at least one fillable field is identified using an optical character recognition technique;
receive, from the audio input device, audio input from a user, wherein the audio input comprises a plurality of portions, each portion comprising input associated with a different fillable field of the form;
identify from the audio input a fillable field associated with each portion of the audio input, wherein the identifying comprises parsing, using an automatic speech recognition technique, the audio input to recognize each of the portions of the audio input and identifying, from the parsed audio input, a fillable field of the form corresponding to each portion of the audio input; and
provide input, using the processor, to the fillable field on the information handling device associated with the audio input, wherein to provide input comprises identifying an input to the fillable field from the parsed audio input and converting the identified input to machine text for input to the identified fillable field.

11. The information handling device of claim 10, wherein the instructions are further executable by the processor to compare the audio input with the at least one fillable field.

12. The information handling device of claim 11, wherein to identify comprises identifying the fillable field based upon the finable field having a similarity to the audio input.

13. The information handling device of claim 10, wherein to provide input comprises providing at least a portion of the audio input to the fillable field.

14. The information handling device of claim 10, wherein the audio input comprises a field identifier and wherein to provide comprises providing input to the fillable field associated with the field identifier.

15. The information handling device of claim 10, wherein the instructions are further executable by the processor to access context data associated with the audio input.

16. The information handling device of claim 15, wherein to identify comprises identifying the fillable field based upon the context data.

17. The information handling device of claim 10, wherein the instructions are further executable by the processor to access source code of the form and wherein to identify comprises identifying the fillable field based upon the source code.

18. A product, comprising:
a storage device that stores code executable by a processor, the code being executable by the processor and comprising:
code that accesses, at an information handling device, a form comprising at least one fillable field, wherein the at least one finable field is identified using an optical character recognition technique;
code that receives, from an audio input device, audio input from a user, wherein the audio input comprises a plurality of portions, each portion comprising input associated with a different fillable field of the form;
code that identifies from the audio input a fillable field associated with each portion of the audio input, wherein the identifying comprises parsing using an automatic speech recognition technique, the audio input to recognize each of the portions of the audio input and identifying, from the parsed audio input, a fillable field of the form corresponding to each portion of the audio input; and
code that provides input, based on the audio input, to the fillable field associated with the audio input, wherein the code that provides input comprises code that identifies an input to the fillable field from the parsed audio input and code that converts the identified input to machine text for input to the identified fillable field.

* * * * *